United States Patent Office
3,239,546
Patented Mar. 8, 1966

3,239,546
POLYAMINE DERIVATIVES OF POLYMERIC FAT ACIDS
Edgar R. Rogier, Hopkins, Minn., assignor to General Mills, Inc., a corporation of Delaware
No Drawing. Filed Jan. 9, 1963, Ser. No. 250,223
6 Claims. (Cl. 260—404.5)

The present invention relates to novel derivatives of polymeric fat acids. More particularly, it relates to polyamines prepared from amino acids and polyamines derived from polymeric fat acids.

The polyamines of my invention have the following idealized, structural formula:

R$\pm$[CHNH(COR'NH)$_y$H]$_x$ where R is the hydrocarbon group of polymeric fat acids, R' is a hydrocarbon group containing from about 1 to about 20 carbon atoms, y is an integer having an average value of from about 1 to about 40 and x is an integer of 2 to about 4. R is preferably a dimeric fat radical and x is preferably 2. R' may be aliphatic, alicyclic or aromatic and such radicals may contain substituent groups which do not interfere with the preparation of the polyamines. R' is preferably an aliphatic hydrocarbon group.

The new compounds of the present invention are prepared from amino acids and polyamines derived from polymeric fat acids. The latter reactants can be prepared from a wide variety of polymeric fat acids. The term "polymeric fat acid" as used herein refers to naturally occurring and synthetic monobasic aliphatic acids having hydrocarbon chains of about 8–24 carbon atoms. The term "fat acids," therefore, includes saturated, ethylenically unsaturated and acetylenically unsaturated acids. These acids are generally polymerized by somewhat different techniques, but because of the functional similarity of the polymerization products, they are generally referred to as "polymeric fat acids." The polymeric fat acids usually contain a predominant portion of dimerized fat acids, a smaller quantity of trimerized and higher polymeric fat acids and some residual monomer.

Saturated fat acids are difficult to polymerize, but polymerization can be obtained at elevated temperatures with a peroxidic reagent such as di-t-butyl peroxide. Because of the low yields of polymeric products, these materials are not commercially significant. Suitable saturated fat acids include branched and straight chain acids such as caprylic acid, pelargonic acid, capric acid, lauric acid, myristic acid, palmitic acid, isopalmitic acid, stearic acid, arachidic acid, behenic acid and lignoceric acid.

The ethylenically unsaturated acids are much more readily polymerized. Catalytic or non-catalytic polymerization techniques can be employed. The non-catalytic polymerization generally requires a higher temperature. Suitable agents for the polymerization include acid or alkaline clays, di-t-butyl peroxide, boron trifluoride and other Lewis acids, anthraquinone, sulfur dioxide and the like. Suitable monomers include the branched and straight chain, poly- and mono-ethylenically unsaturated acids such as 3-octenoic acid, 11-dodecenoic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid and chaulmoogric acid.

Acetylenically unsaturated acids, such as isanic and isanolic acids, can also be polymerized to give polymeric acids which can be used. The actylenically unsaturated acids occur only rarely in nature and are expensive to synthesize. Therefore, they are not currently of commercial significance.

Although any one of the above-described saturated, ethylenically unsaturated and acetylenically unsaturated fat acids may be used to prepare the polymeric fat acids, it is generally the practice in the art to polymerize mixtures of acids (or the simple aliphatic alcohol esters—i.e., the methyl esters) derived from the naturally occurring drying and semi-drying oils. Suitable drying or semi-drying oils include soybean, linseed, tall, tung, perilla, oiticia, cottonseed, corn, sunflower, dehydrated castor oil and the like. Also, the most readily available acids are oleic and linoleic and thus they are preferred starting materials for the preparation of the polymeric fat acids.

It is understood that relatively pure dimerized fat acids, trimerized fat acids, and higher polymers of fat acids can be used as well as mixtures thereof. Relatively pure dimerized fat acids, for example, can be obtained from mixtures of the polymeric fat acids by high vacuum distillation or solvent extraction.

The polyamine starting materials are prepared from the polymeric fat acids by converting the polymeric fat acids to the corresponding polynitriles and then hydrogenating the nitriles to form the polyamines. The polynitriles are formed by reacting the polymeric fat acids with ammonia under nitrile forming conditions. The details of this reaction are set forth in chapter 2 of "Fatty Acids and Their Derivatives" by A. W. Ralston, John Wiley & Sons, Inc., New York (1948). The polyamines are prepared by hydrogenating the polynitriles in the presence of ammonia and a catalyst such as Raney nickel. The preparation of the polyamines can be illustrated by the following equations (using a dimerized fat acid as an example):

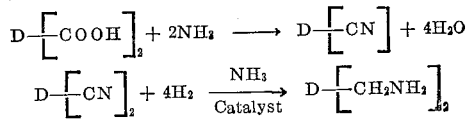

where D is a dimeric fat radical.

Where a relatively pure dimer amine is desired, for example, a dimerized fat acid may be used as the starting material. Also, the corresponding polynitrile and/or polyamine may be distilled to provide the relatively pure dimer amine.

A wide variety of amino acids can be used in the preparation of the polyamines of the present invention. Representative of such compounds are 6-aminocaproic acid, 7-aminoheptanoic acid, 8-aminooctanoic acid, 10-aminodecanoic acid, 11-aminoundecanoic acid, 9-aminostearic acid, 12-aminostearic acid, 14-aminobehenic acid, p-aminobenzoic acid, p-aminocyclohexanoic acid, norcamphaneaminocarboxylic acids and the like. The simple alkyl esters of such acids may be used—i.e., butyl 7-aminoheptanoate, for example. The corresponding cyclic lactams of the aliphatic amino acids can also be used. Preferably, the amino acid reactant contains from about 4 to about 20 carbon atoms. Mixtures of the various amino acid reactants can also be used.

The new polyamines are prepared by heating the amino acid compound and the polyamine derived from polymeric fat acids under amide forming conditions. Reaction temperatures of about 150° to 300° C. are particularly suitable. It may be desirable to employ a low temperature initially (i.e., 150° C.), such that the reaction can be readily controlled, and then raise the temperature at a later stage to facilitate substantial completion of the reaction. The reaction may also be carried out in the presence of a diluent or solvent. Suitable solvents include phenol, cresols, diphenyl oxide, and thymol. After the completion of the reaction, the solvent can be removed such as by evaporation or distillation. The ratios of the reactants will vary according to the particular product desired. For example, where a polyamine of the above-defined formula wherein $y$ is 20 is desired, at least 20 moles of amino acid will be used for each of the amine groups of 1 mole of the polyamine derived from the polymeric fat acid. It is preferred to employ a slight excess of the amino acid over that required to produce the desired polyamine. After completion of the reaction, the excess amino acid and any remaining water can be vacuum distilled from the polyamine.

The following examples serve to illustrate the present invention without, however, limiting the same thereto.

EXAMPLE I

Into a glass reaction vessel equipped with a stirrer, thermocouple and distillation head were charged 216 g. 6-aminocaproic acid and 204 g. distilled dimer amine. The dimer amine was derived from a dimerized fat acid prepared from the mixture of acids in tall oil. The dimerized fat acid consisted essentially of a mixture of dimerized linoleic and oleic acids. The dimer amine had the following properties: weight percent dimer—98; and amine eq. wt.—273. The reaction mixture was heated at 220° C. with stirring for 3.8 hours under a nitrogen atmosphere. Vacuum was then applied for 1 hour at 250° C. to remove excess 6-aminocaproic acid in the form of caprolactam (16.8 g.). There was obtained a diamine having the formula:

$$D-[CH_2NH(COCH_2CH_2CH_2CH_2CH_2NH)_2H]_2$$

where D is the dimeric fat radical derived from the dimerized fat acid. The diamine had a melting point (M.P.) of 69° C., amine eq. wt. of 528 and an inherent viscosity of 0.12 in m-cresol (1% by weight, 30° C.).

EXAMPLES II–V

Example I was repeated using different ratios of the dimer amine and 6-aminocaproic acid (Examples II–IV) and a second amine acid, 11-aminoundecanoic acid (Example V). The reactions were carried out at 220° C. for times of 5.5, 3.5, 4 and 3 hours, respectively. The results are set forth in the following table:

*Table*

| Example | Dimer Amine (g.) | Amino Acid | | Diamine Product | | | |
|---------|------------------|------------|------|------|-----------------|---------|-----------|
|         |                  | Name       | (g.) | $y$  | Amine (eq.wt.)  | M.P.[1], °C. | Inh. Visc.[2] |
| II      | 140              | 6-aminocaproic | 210 | 3.0 | 612 |     | 0.16 |
| III     | 229              | ----do----     | 441 | 3.9 | 722 |     | 0.16 |
| IV      | 89.2             | ----do----     | 180 | 4.2 | 798 |     | 0.17 |
| V       | 200              | 11-aminoundecanoic | 400 | 2.7 | 823 | 175 | 0.17 |

[1] The M.P. was determined by the method described in "Preparative Methods of Polymer Chemistry"—Sorenson and Campbell—1961—Interscience Publishers, Inc.—pages 49–50.
[2] Inherent viscosity determined using a 1% by weight concentration of the diamine in m-cresol at 30° C.

The above examples show that a variety of polyamines can be prepared according to the present invention. The diamines of Examples II–IV have substantially the same formula as set forth in Example I but wherein $y$ varies from 3.0 to 4.9. The diamine of Example V has the following formula:

$$D-[CH_2NH(COR'NH)_yH]_x$$

where $x$ is 2, $y$ is 2.7, D is the dimeric fat radical derived from the dimerized fat acid, and R' is the polymethylene radical derived from the 11-aminoundecanoic acid.

The new polyamines of the present invention are useful for preparing polyamideureas by reaction with polyisocyanates. The polyamideureas are particularly useful as molding compounds. The polyamideureas are disclosed and claimed in the copending application of Marwan R. Kamal entitled "Polyamideureas From Polyisocyanates," Serial No. 250,217, filed of even date.

It is to be understood that the invention is not to be limited to the exact details of operation or the exact compositions shown and described, as obvious modifications and equivalents will be apparent to those skilled in the art and the invention is to be limited only by the scope of the appended claims.

The embodiments of the invention in which an exclusive property or privilege is claimed are defined as follows:

1. A polyamine having the formula:

$$R-[CH_2NH(COR'NH)_yH]_x$$

where R is the hydrocarbon group of polymeric fat acids, said polymeric fat acids having been prepared by polymerizing monobasic aliphatic carboxylic acids of 8–24 carbon atoms, R' is a divalent hydrocarbon group containing from about 1 to about 20 carbon atoms, $y$ is an integer of from about 1 to about 40 and $x$ is an integer of 2 to about 4.

2. The polyamine of claim 1 where R' is a divalent aliphatic group.

3. The polyamine of claim 1 where R' is a divalent alicyclic group.

4. The polyamine of claim 1 where R' contains from about 4 to about 20 carbon atoms.

5. A diamine having the formula:

$$D-[CH_2NH(COR'NH)_yH]_2$$

where D is the divalent hydrocarbon group of dimeric fat acids, said dimeric fat acids having been prepared by polymerizing monobasic aliphatic carboxylic acids of 8–24 carbon atoms, R' is a divalent hydrocarbon group containing from about 1 to about 20 carbon atoms and $y$ is an integer of from about 1 to about 40.

6. The diamine of claim 5 where R' is a divalent aliphatic group containing from about 4 to about 20 carbon atoms.

No references cited.

CHARLES B. PARKER, *Primary Examiner.*